No. 791,526.

Patented June 6, 1905.

UNITED STATES PATENT OFFICE.

HUGO WITTER, OF ELBERFELD, GERMANY, ASSIGNOR TO FARBENFABRIKEN OF ELBERFELD CO., OF NEW YORK, N. Y., A CORPORATION OF NEW YORK.

YELLOW TETRAZO DYE.

SPECIFICATION forming part of Letters Patent No. 791,526, dated June 6, 1905.

Application filed March 13, 1905. Serial No. 249,815.

*To all whom it may concern:*

Be it known that I, HUGO WITTER, doctor of philosophy, chemist, (assignor to the FARBENFABRIKEN OF ELBERFELD COMPANY, of New York,) residing at Elberfeld, Germany, have invented a new and useful Improvement in New Azo Dyes; and I hereby declare the following to be a clear and exact description of my invention.

My invention relates to the production of new tetrazo dyestuffs which dye wool from acid-baths yellow shades fast to milling and do not stain the interwoven white cotton or wool.

The new dyestuffs can be obtained by combining with two molecular proportions of alpha-methylindole (methyl-ketole) one molecular proportion of the tetrazotized derivatives of benzidin or tolidin-meta-disulfonic acid having the following general formula:

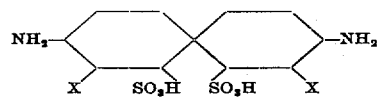

in which formula X means hydrogen atoms, which can be replaced by the methylic group.

The new coloring-matters are after being dried and pulverized in the shape of their alkaline salts brownish-yellow powders soluble in water and in concentrated sulfuric acid with a yellow color and yielding upon reduction with stannous chlorid and hydrochloric acid the diamidodiaryldisulfonic acids having the above-given general formula and amidomethylketol. They dye wool from acid-baths yellow shades fast to milling.

In carrying out my process practically I can proceed as follows, (the parts being by weight:) Three hundred and forty-four parts of benzidin-meta-disulfonic acid are diazotized in the known manner with the aid of one hundred and thirty-eight parts of sodium nitrate and the necessary quantity of hydrochloric acid. The tetrazo compound thus obtained is mixed on cooling with a solution of two hundred and eighty parts of alpha-methylindol (methylketol) in two thousand parts of hydrochloric acid, (20° Baumé,) and an excess of sodium acetate is then added thereto. The formation of the dyestuff will be completed after twelve hours. Subsequently the reaction mass is rendered alkaline by the addition of sodium carbonate, and the dyestuff is isolated in the usual manner. It is after being dried and pulverized a brownish-yellow powder soluble in water and in concentrated sulfuric acid with a yellow color. Upon treatment with stannous chlorid and hydrochloric acid benzidin-meta-disulfonic acid and amidomethylketol is obtained. It dyes wool from acid-baths yellow shades fast to milling.

The process proceeds in an analogous manner on replacing the benzidin-meta-disulfonic acid by the tolidin-meta-disulfonic acid.

Having now described my invention and in what manner the same is to be performed, what I claim as new, and desire to secure by Letters Patent, is—

1. The herein-described new tetrazo dyestuffs obtainable by the combination of the tetrazo compounds of the paradiamin disulfonic acids having the above-given formula with two molecular proportions of alpha-methylindol, which dyestuffs are in the shape of their alkaline salts brownish-yellow powders soluble in water and in concentrated sulfuric acid with a yellow color; yielding upon reduction with stannous chlorid and hydrochloric acid the diamidodiaryldisulfonic acids of the above-given formula and amido-alpha-methylindol; and dyeing wool from acid-baths yellow shades, substantially as hereinbefore described.

2. The herein-described new tetrazo dyestuff obtainable by the combination of the tetrazo compound of benzidin-meta-disulfonic acid with two molecular proportions of alpha-methylindol, which dyestuff is in the shape of its sodium salt a brownish-yellow powder soluble in water and in concentrated sulfuric acid with a yellow color; yielding upon reduction with stannous chlorid and hydrochloric acid benzidin-meta-disulfonic acid and amido-alpha-methylindol, and dyeing wool from acid-baths yellow shades, substantially as hereinbefore described.

In testimony whereof I have signed my name in the presence of two subscribing witnesses.

HUGO WITTER.

Witnesses:
OTTO KÖNIG,
J. A. RITTERSHAUS.

Correction in Letters Patent No. 791,526.

It is hereby certified that in Letters Patent No. 791,526, granted June 6, 1905 upon the application of Hugo Witter, of Elberfeld, Germany, for an improvement in "Yellow Tetrazo Dyes," an error appears in the printed specification requiring correction, as follows: In line 42, page 1, the word "nitrate" should read *nitrite;* and that the said Letters Patent should be read with this correction therein that the same may conform to the record of the case in the Patent Office.

Signed and sealed this 8th day of August, A. D., 1905.

[SEAL.]

E. B. MOORE,
*Acting Commissioner of Patents.* fonic acid with two molecular proportions of alpha-methylindol, which dyestuff is in the shape of its sodium salt a brownish-yellow powder soluble in water and in concentrated
5 sulfuric acid with a yellow color; yielding upon reduction with stannous chlorid and hydrochloric acid benzidin-meta-disulfonic acid and amido-alpha-methylindol, and dyeing wool from acid-baths yellow shades, substantially as hereinbefore described.

In testimony whereof I have signed my name in the presence of two subscribing witnesses.

HUGO WITTER.

Witnesses:
OTTO KÖNIG,
J. A. RITTERSHAUS.

---

Correction in Letters Patent No. 791,526.

It is hereby certified that in Letters Patent No. 791,526, granted June 6, 1905 upon the application of Hugo Witter, of Elberfeld, Germany, for an improvement in "Yellow Tetrazo Dyes," an error appears in the printed specification requiring correction, as follows: In line 42, page 1, the word "nitrate" should read *nitrite;* and that the said Letters Patent should be read with this correction therein that the same may conform to the record of the case in the Patent Office.

Signed and sealed this 8th day of August, A. D., 1905.

[SEAL.]

E. B. MOORE,
*Acting Commissioner of Patents.*

It is hereby certified that in Letters Patent No. 791,526, granted June 6, 1905 upon the application of Hugo Witter, of Elberfeld, Germany, for an improvement in "Yellow Tetrazo Dyes," an error appears in the printed specification requiring correction, as follows: In line 42, page 1, the word "nitrate" should read *nitrite;* and that the said Letters Patent should be read with this correction therein that the same may conform to the record of the case in the Patent Office.

Signed and sealed this 8th day of August, A. D., 1905.

[SEAL.]
E. B. MOORE,
*Acting Commissioner of Patents.*